United States Patent [19]  [11]  4,321,187
Granzow  [45]  Mar. 23, 1982

[54] PHOSPHINIC ACID FLAME RETARDANTS FOR POLYPHENYLENE ETHER RESINS
[75] Inventor: Albrecht H. Granzow, Somerset, N.J.
[73] Assignee: American Cyanamid Company, Stamford, Conn.
[21] Appl. No.: 165,590
[22] Filed: Jul. 3, 1980
[51] Int. Cl.$^3$ ............................................. C08K 5/50
[52] U.S. Cl. ..................................... 524/133; 525/132
[58] Field of Search .................... 260/45.7 P, 45.9 K, 260/45.9 KA

[56] References Cited
U.S. PATENT DOCUMENTS
3,322,716  5/1967  Klein et al. ...................... 260/45.7 P
4,101,504  7/1978  Cooper et al. ................. 260/45.7 P Primary Examiner—Harold D. Anderson
Attorney, Agent, or Firm—Bruce F. Jacobs

[57]  ABSTRACT

Flame retardant compositions are prepared from rubber-modified polyphenylene ether resins and a phosphinic acid of the formula

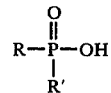

wherein R is aryl, alkyl, cycloalkyl and beta-cyano-substituted alkyl, and R' is hydrogen or the same groups as R.

5 Claims, No Drawings

PHOSPHINIC ACID FLAME RETARDANTS FOR POLYPHENYLENE ETHER RESINS

The present invention relates to flame-retardant, polyphenylene-ether resin compositions containing an effective flame-retardant amount of a phosphinic acid represented by the formula:

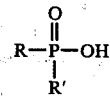

wherein R represents an aryl radical, an alkyl ($C_1$–$C_8$) radical, a cycloalkyl radical or a beta-cyano-substituted alkyl ($C_2$–$C_4$) radical; R' represents hydrogen, an aryl radical, an alkyl ($C_1$–$C_8$) radical, a cycloalkyl radical, or a beta-cyano-substituted alkyl ($C_2$–$C_4$) radical. Preferred compounds include (di-n-butyl)phosphinic acid, dicyclohexylphosphinic acid, diisobutylphosphinic acid, diphenylphosphinic acid, and di(2-cyanoethyl)-phosphinic acid, having the following structures respectively:

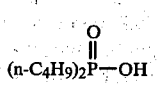

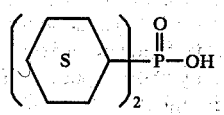

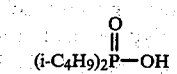

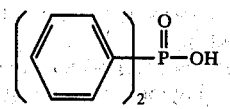

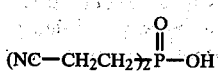

All of the phosphinic acid compounds of the invention are known and are readily prepared, as described by Klein et al., U.S. Pat. No. 3,322,716, by the reaction of di-substituted phosphines with hydrogen peroxide. Klein et al. also describe the utility of the phosphinic acid compounds as flame retardants for thermoplastic polymers of the vinyl type, including polyolefins and polystyrene. However, as shown by Example 4 below, these compounds have been found to not flame retard rubber-modified polystyrene resins per se, i.e. in the absence of the polyphenylene ether resin.

Flame-retardant, rubber-modified polyphenylene-ether resin compositions of the present invention may be prepared by incorporating therein an effective flame-retarding amount of a phosphinic acid described hereinabove.

The polyphenylene ether resins, suitable for use in the present invention with the various phosphinic acids, are described in U.S. Pat. No. 4,024,093, incorporated herein by reference. Basically, these resin compositions comprise about 10 to 90 parts by weight of polyphenylene ether and about 90 to 10 parts by weight of a styrene polymer. Preferably, the polymer contains about 30 to 70 parts by weight of polyphenylene ether resin and about 70 to 30 parts by weight of the styrene polymer. The styrene polymer is a rubber-modified, high impact polystyrene. The polyphenylene ether resins used herein are blends of the two polymers, which are mutually soluble and form a homogeneous polymer composition.

The flame-retardant compounds are used in the polyphenylene-ether resin compositions in an amount sufficient to provide a self-extinguishing composition. In general, that amount is at least about 2 percent by weight, preferably about 4 to 6 percent by weight. Not every phosphinic acid is equally effective in all polyphenylene ether resin compositions. Diisobutylphosphinic acid and dicyclohexyl phosphinic acid are surprisingly effective flame-retardant compounds.

It is also within the scope of the present invention to incorporate into the polyphenylene ether resin compositions other ingredients commonly used therein, such as plasticizers, dyes, pigments, heat and light stabilizers, antioxidants, antistatic agents, photochromic materials, and the like.

The examples which follow illustrate the invention in greater detail. All parts and percents are by weight unless otherwise specified.

EXAMPLE 1

A total of 10 grams of a 50/50 blend of polyphenylene ether/rubber-modified impact polystyrene was dry blended with the flame-retardant compound and extruded through a melt index apparatus (described in ASTM D-1238) at about 290°–300° C. The cylindrical extrudate, 3–5 inches in length and about 0.25 inch in diameter, is subjected to the following flammability test procedure described in Underwriters Laboratories Test UL-94, Vertical Test Method 3.10–3.15 (September, 1973). The polymer sample, clamped in a vertical position, is ignited with a ¾" blue flame (Methane or natural gas) for 10 seconds and the flame is withdrawn. If the flame is extinguished within 25 seconds, it is reignited for 10 seconds and the flame again withdrawn. The flame-extinguishment time is again recorded. If the flame-extinguishment time does not exceed 5 seconds for either flame application, the sample is rated V-0. If the flame-extinguishment time for either the first or second flame application is between 5 and 25 seconds, it is rated V-1. If a sample shows extinguishment times greater than 25 seconds for either flame application, it is rated "free-burning" (FB) and it is considered to have failed the test.

Data in Table I illustrate the activity of several phosphinic acids incorporated into the 50/50 blend at 6 percent by weight.

TABLE I

Evaluation of Phosphinic Acids in 50/50 Polyphenylene Ether/High Impact Polystyrene

| Compound | | |
|---|---|---|
| R | R' | Flammability Rating |
| n-$C_4H_9$— | n-$C_4H_9$— | V-1 |
| (thienyl) | (thienyl) | V-1 |
| i-$C_4H_9$— | i-$C_4H_9$— | V-0 |
| (phenyl) | (phenyl) | V-1 |
| (phenyl) | H— | V-1 |

TABLE I-continued

Evaluation of Phosphinic Acids in 50/50 Polyphenylene Ether/High Impact Polystyrene

| Compound | | Flammability Rating |
|---|---|---|
| R | R' | |
| $C_6H_{13}CH-$<br>$\|$<br>$OH$ | $C_6H_{13}CH-$<br>$\|$<br>$OH$ | FB |
| $C_{11}H_{23}CH-$<br>$\|$<br>$OH$ | $C_{11}H_{23}CH-$<br>$\|$<br>$OH$ | FB |
| Ph-CH-<br>$\|$<br>$OH$ | Ph-CH-<br>$\|$<br>$OH$ | FB |
| Control (no additive) | | FB |

Data in Table II illustrate the effectiveness of several phosphinic acids in the 50/50 blend at both 4 percent and at 2 percent by weight.

TABLE II

| Compound | | Flammability Rating | |
|---|---|---|---|
| R | R' | 4% | 2% |
| thienyl | thienyl | V-1 | V-1 |
| phenyl | H | FB | FB |
| i-$C_4H_9$— | i-$C_4H_9$— | V-0 | V-1 |
| phenyl | phenyl | V-1 | FB |
| $NCCH_2CH_2-$ | $HCCH_2CH_2-$ | V-1 | FB |

EXAMPLE 2

The procedure of Example 1 was repeated except the flame-retardant compound was dry blended with a polymer blend comprising 35-weight percent polyphenylene ether resin and 65-weight percent high impact, rubber-modified polystyrene. Dicyclohexyl phosphinic acid was incorporated into the polymer blend at a level of 6 percent and 4 percent and the flammability tested as described. The following results were obtained:

| Additive | Flammability Rating |
|---|---|
| None | FB |
| 6% | V-1 |
| 4% | V-1 |

EXAMPLE 3

The procedure of Example 1 was repeated except that the polymer blend comprised 70-weight percent polyphenylene ether resin and 30-weight percent high-impact, rubber-modified polystyrene. The following phosphinic acids were evaluated as flame retardants at 4 percent by weight:

| Compound | | Flammability Rating |
|---|---|---|
| R | R' | |
| thienyl | thienyl | V-1 |
| $NCCH_2CH_2-$ | $NCCH_2CH_2-$ | V-1 |
| phenyl | phenyl | V-1 |
| Control (no additive) | | FB |

EXAMPLE 4

Following the procedure of Example 1, a determination was made of the flammability rating of a high-impact, rubber-modified polystyrene containing 10 percent by weight of (a) dicyclohexyl phosphinic acid, (b) diphenylphosphinic acid, (c) phenylphosphinic acid, and (d) diisobutylphosphinic acid. When the flammability was determined according to the UL-94 Test, all specimens were free-burning (FB).

The above four examples illustrate that (1) all of the phosphinic acids of the invention are effective flame retardants for a 50/50 blend of polyphenylene ether resin/high-impact, rubber-modified polystyrene at a concentration of about 6 percent by weight; (2) that diisobutylphosphinic acid and dicyclohexylphosphinic acid are particularly effective flame retardants therefore in that they provide flame retarded compositions at a concentration of only about 2 percent; (3) dicyclohexylphosphinic acid is effective as a flame retardant at a level of 4-weight percent in blends containing as little as 35-weight percent polyphenylene ether resin; and (4) that none of the compounds are effective at concentrations as high as 10-weight percent in rubber-modified polystyrene, the rubbery component of the resins.

What is claimed is:

1. A flame-retardant composition comprising a homogeneous blend of polymers containing about 10 to 90 parts by weight polyphenylene ether resin, about 90 to 10 parts by weight rubber-modified polystyrene, and a flame-retarding effective amount about 4 percent or less by weight based on the blend of polymers of a phosphinic acid of the formula:

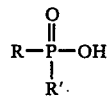

wherein R and R' are the same and are isobutyl or cyclohexyl.

2. The composition of claim 1 wherein the blend contains about 30 to 70 parts of polyphenylene ether resin and 30 to 70 parts of rubber-modified polystyrene.

3. The composition of claim 1 wherein the flame-retardant compound is diisobutyl phosphinic acid.

4. The composition of claim 1 wherein the flame-retardant compound is dicyclohexylphosphinic acid.

5. The composition of claim 1 wherein the blend is about 35% polyphenylene ether and about 65% rubber-modified polystyrene, and the phosphinic acid is dicyclohexyl phosphinic acid.

* * * * *